United States Patent
Zhu et al.

(10) Patent No.: US 7,202,751 B2
(45) Date of Patent: Apr. 10, 2007

(54) OPTICALLY PUMPED FREQUENCY STANDARD WITH REDUCES AC STARK SHIFT

(75) Inventors: Miao Zhu, San Jose, CA (US); Leonard S. Cutler, Los Altos Hills, CA (US); John Edwin Berberian, Dallas, TX (US)

(73) Assignee: Agilent Inc., Santa Clara, CA (US)

( * ) Notice: Subject to any disclaimer, the term of this patent is extended or adjusted under 35 U.S.C. 154(b) by 351 days.

(21) Appl. No.: 10/968,264

(22) Filed: Oct. 18, 2004

(65) Prior Publication Data
US 2006/0083277 A1    Apr. 20, 2006

(51) Int. Cl.
*H03B 17/00* (2006.01)

(52) U.S. Cl. ............... 331/3; 331/94.1; 327/39; 327/32; 324/301

(58) Field of Classification Search ............... 331/3, 331/94.1
See application file for complete search history.

(56) References Cited

U.S. PATENT DOCUMENTS 6,265,945 B1 * 7/2001 Delaney et al. ............. 331/3
6,888,780 B2 * 5/2005 Happer et al. .............. 368/10
6,993,058 B2 * 1/2006 Zhu ............................ 372/106
2005/0207456 A1 * 9/2005 Berberian et al. .......... 372/11

* cited by examiner

Primary Examiner—Joseph Chang

(57) ABSTRACT

An apparatus for generating a stabilized frequency signal is disclosed. The apparatus includes a quantum absorber having first, second, and third energy states. The quantum absorber is irradiated by a first radiation source that generates electromagnetic radiation having a frequency, $v_L$, that induces transitions between the first and third energy states. The quantum absorber is also irradiated by a second radiation source that generates electromagnetic radiation having a frequency, $v_M$, that induces transitions between the first and second energy states. A detector that generates a detector signal indicative of the level of radiation leaving the quantum absorber in a frequency range including $v_L$ is used by a number of servo loops. One of the servo loops determines the value of $v_L$ that minimizes or maximizes the detector signal and a second servo loop determines an offset signal that reduces the dependence of $v_M$ on the intensity of the first radiation source.

20 Claims, 2 Drawing Sheets

OPTICALLY PUMPED FREQUENCY STANDARD WITH REDUCES AC STARK SHIFT

BACKGROUND OF THE INVENTION

For many applications it is of great importance to precisely determine the transition frequency between two energy states in an atom (or other quantum absorber such as a molecule, or an ion). An atomic frequency standard uses this transition frequency to define its output frequency while a magnetometer uses this transition frequency to measure the magnetic field strength. Because the environment, which the quantum absorber is exposed to, can perturb the energies of these two energy states, the corresponding transition frequency can also be perturbed. The choice of the two energy states depends on the specific application. An atomic frequency standard chooses these two energy states so that the transition frequency is insensitive to the environmental parameters. A sensor (e.g., a magnetometer) chooses these two energy states so that the transition frequency is sensitive to the physical quantity (e.g., the magnetic field strength) that it measures but insensitive to all the other environmental parameters.

To simplify the following discussion, the example of an atomic frequency standard will be utilized. However, the discussion also applies to the sensor applications. In one class of atomic frequency standards, the two energy states belong to the manifold of the ground state of a suitable atomic species, e.g., Rb or Cs. The transition frequency, which defines the output frequency of the atomic frequency standard, between these two energy states is in the microwave frequency range. In the following discussion, these two energy states are called state A and state B. Also there is an additional energy state, state E, which belongs to the manifold of the excited states. Further, it is assumed that the energies of the energy states, $E_\alpha$ ($\alpha$=A, B, or E) satisfy the relation $E_E > E_B > E_A$. In addition, it will be assumed that the allowed transition between state E and state A (or state B) has a transition frequency in the optical range.

At room temperature, state A and state B are nearly equally populated while state E is nearly un-populated. In this case, if the atoms are irradiated with a microwave field, it is difficult to observe the induced transition between state A and state B. However, if the atoms are irradiated with an optical field at the appropriate frequency, the atom in one of the energy states, say state A, will absorb a photon and make a transition to state E. When the same atom decays from state E to the ground state, some of the decays are to states different from state A. Therefore this optical-pumping process depopulates state A and generates a population difference between state A and state B. Consequently, the absorption of the applied optical field and the fluorescence are reduced. The relaxation process, such as collisions, re-populates state A. The efficiency of the optical pumping process is maximized when the frequency of the optical field, $\nu_L$, is equal to the frequency of the transition between state A and state E, $\nu_0 \equiv (E_E - E_A)/h$, where h is the Planck constant. For a simplified three-state atomic system, a conventional dither-and-phase-sensitive-detection servo loop can be used to keep $\nu_L = \nu_0$.

Now, if the atoms are also irradiated with a microwave field at the frequency in the vicinity of the transition frequency between state A and state B, the induced transition will increase the population in state A. Hence the absorption of the applied optical field and the fluorescence are increased. If the applied microwave frequency, $\nu_M$, equals the transition frequency between state A and state B, $\nu_{BA} \equiv (E_B - E_A)/h$, both the absorption of the applied optical field and the fluorescence are maximized. Again a dither-and-phase-sensitive-detection servo loop can be used to keep $\nu_M = \nu_{BA}$.

Unfortunately, the atom under study exhibits an AC Stark Shift (light shift). That is, the energy difference between states A and B depends on the intensity of the applied optical field. As a result, $\nu_{BA}$ is a function of the intensity of the applied optical field used to optically pump the atoms. To provide a standard of high precision, a light source with an extremely stable intensity is needed. The cost of providing such a source significantly increases the cost of such an optically pumped atomic frequency standard.

SUMMARY OF THE INVENTION

The present invention includes an apparatus for controlling the frequency of a radiation source. The apparatus includes an absorber that is irradiated by first and second radiation sources and first and second controllers that set the frequencies of these radiation sources. The absorber includes a material having first, second, and third energy states. The first radiation source generates a first electromagnetic radiation having a frequency, $\nu_L$, that induces transitions between the first and third energy states, the first electromagnetic radiation source irradiating the absorber at an optical radiation intensity. The first and second energy states differ in energy by an amount that depends on the optical radiation intensity. The second radiation source generates a second electromagnetic radiation having a frequency, $\nu_M$, that induces transitions between the first and second energy states. The first controller t sets $\nu_M$ so as to maintain the absorption of the first electromagnetic radiation by the absorber at a target value. The second controller sets $\nu_L$ to a value that is offset from $\nu_{MAX}$, where $\nu_{MAX}$ is the value of $\nu_L$ at which the absorption of the first electromagnetic radiation by the absorber is maximized. The offset is chosen such that the dependence of the difference in energy between the first and second energy states on the optical radiation intensity at $\nu_L$ is less than the dependence of the difference in energy between the first and second energy states on the optical radiation intensity at $\nu_{MAX}$. In one embodiment, an output circuit that generates a signal having a frequency determined by $\nu_M$ is provided. In one embodiment, the first radiation source includes a laser and the second radiation source includes a microwave generator. In one embodiment, the second controller includes a first servo loop that determines the laser frequency offset from $\nu_{MAX}$ by determining the energy difference between the first and second energy states of the absorber at first and second values for the optical radiation intensity. In one embodiment, the absorber includes hydrogen or an alkali metal.

DETAILED DESCRIPTION OF THE PREFERRED EMBODIMENTS OF THE INVENTION

Figure 1:
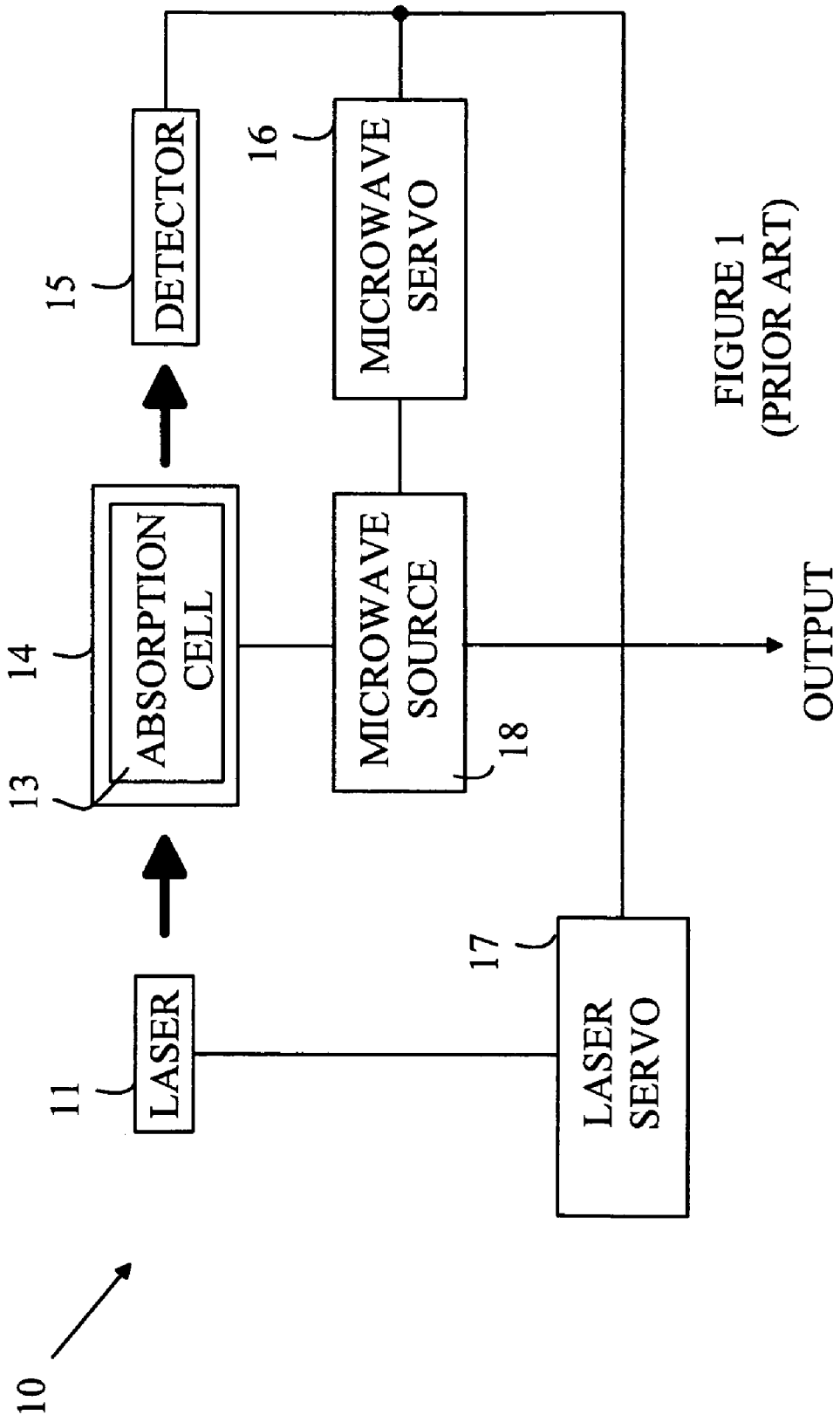
FIG. 1 illustrates a prior art optically pumped frequency standard.

The manner in which the present invention provides its advantages can be more easily understood with reference to FIG. 1, which illustrates a prior art optically pumped frequency standard 10. A laser 11 having a frequency that is set by a laser servo 17 in response to an input signal is used to irradiate absorption cell 13. Absorption cell 13 contains suitable quantum absorbers such as $^{87}$Rb or $^{133}$Cs. Absorption cell 13 is located inside a microwave cavity 14 that is excited by microwave source 18. The intensity of light leaving absorption cell 13 is measured by a detector 15.

Laser servo 17 sets the laser frequency to maximize the absorption of the laser output light in absorption cell 13. For example, an algorithm that assumes that the transmission of the absorption cell is a symmetric function of laser frequency detuning, $\Delta \equiv v_L - v_0$, can be utilized. Denote the current laser center frequency by $v_L$. In such a system, servo 17 periodically measures the transmission of absorption cell 13 at frequencies of $v_L + \delta v_L$ and $v_L - \delta v_L$, where $\delta v_L > 0$ is a predetermined frequency increment. If the transmission at $v_L + \delta v_L$ is less than that at $v_L - \delta v_L$, the laser frequency is increased. Similarly, if the transmission at $v_L + \delta v_L$ is greater than that at $v_L - \delta v_L$, the laser frequency is reduced. If the measured transmission values are equal, the laser is correctly set on the absorption maximum. If the transmission of the absorption cell is not a symmetric function of the laser frequency detuning, with a small $\delta v_L$, the laser frequency will still be stabilized very close to the absorption maximum using the method described above. Although the square-wave frequency modulation is used as an example for laser frequency stabilization, other types of modulation waveforms, together with appropriate demodulation methods, can also be used.

A microwave servo 16 sets the microwave frequency to maximize the absorption of the laser light in absorption cell 13 as a function of the microwave frequency. For example, an algorithm analogous to that discussed above for setting the laser frequency can be utilized. Denote the current microwave frequency by $v_M$. The microwave servo periodically measures the transmission of absorption cell 13 at frequencies of $v_M + \delta v_M$ and $v_M - \delta v_M$, where $\delta v_M > 0$ a predetermined frequency increment. If the measured transmission values are equal, the microwave source 18 is correctly set on the transmission minimum. If the transmission at $v_M + \delta v_M$ is less than that at $v_M - \delta v_M$, the microwave frequency is increased. Similarly, if the transmission at $v_M + \delta v_M$ is greater than that at $v_M - \delta v_M$, the microwave frequency is reduced. Again other modulation waveforms can be used for microwave frequency control. The unity gain frequency of the microwave frequency servo-loop is typically lower than that of the laser frequency servo-loop, so that the two servo-loops do not interfere with one another.

A signal derived from the microwave frequency is output by the frequency standard. In the simplest case, this is just the microwave signal itself. However, other signals that are derived from the microwave signal can also be provided.

As noted above, the frequency difference (or energy difference) between the two lower energy states in the quantum absorber that determine the microwave frequency depends on the intensity of the laser light used to irradiate the quantum absorber due to the AC Stark Shift. This dependence introduces an error into the frequency standard, since the intensity of light from the laser varies over time unless some mechanism is used to stabilize the laser output intensity. As noted above, such stabilized lasers increase the cost of the frequency standard, and hence, are to be avoided.

Figure 2:
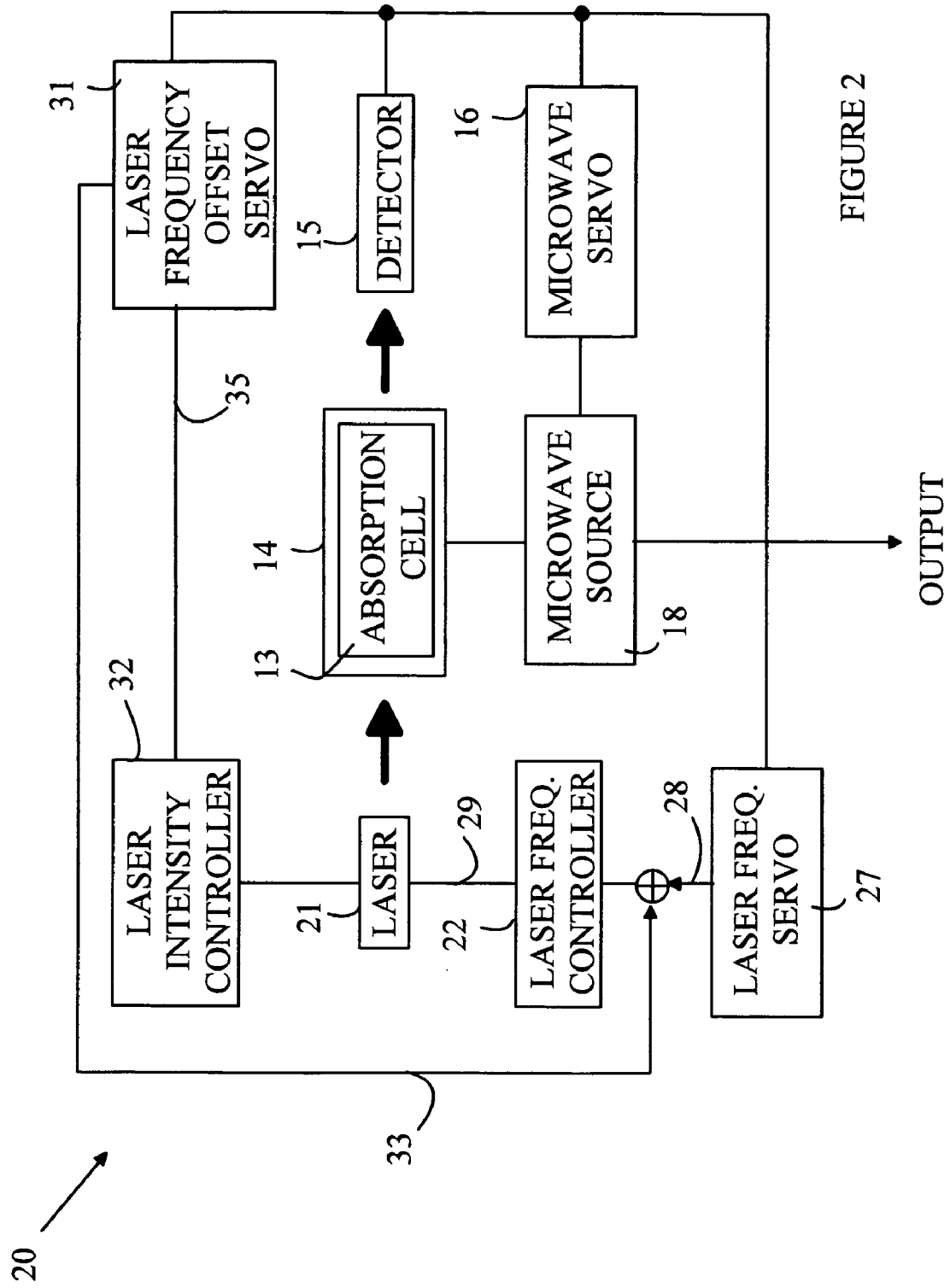
FIG. 2 illustrates an optically pumped frequency source according to one embodiment of the present invention.

The present invention is based on the observation that the dependence of the energy difference between the two lower energy states in the quantum absorber on the laser intensity can be substantially reduced by slightly detuning the laser frequency from the absorption maximum. Refer now to FIG. 2, which illustrates an optically pumped frequency standard 20 according to one embodiment of the present invention. To simplify the following discussion, those elements of frequency standard 20 that serve functions analogous to those discussed above with reference to frequency standard 10 have been given the same numeric designations and will not be discussed in detail here. Frequency standard 20 utilizes a laser 21 to irradiate the contents of absorption cell 13.

The light generated by laser 21 has a frequency and an intensity that can be controlled by control signals that are applied thereto. Since such lasers are known to the art, they will not be discussed in detail here. For example, a laser having a Fabrey-Perot cavity with moveable mirrors can be utilized. The cavity contains a gain material that is electrically or optically pumped. The frequency of the laser light can be controlled by the distance between the mirrors. The intensity of the laser light can be controlled by the strength of the pumping source.

The intensity of the light leaving absorption cell 13 is measured by detector 15, which generates an output signal that is utilized by the various servo loops. Microwave servo 16 operates in a manner analogous to that discussed above and controls the frequency of the microwave radiation generated by microwave source 18.

The laser frequency is controlled by the signals generated from two different servos. Laser frequency servo 27 generates a control signal on line 28 that would adjust the output frequency of laser 21 to maximize the absorption of the laser light generated by laser 21 in absorption cell 13 if the signal on line 33 is zero. Laser frequency servo 27 operates in a manner analogous to that discussed above.

The second laser servo generates an offset signal on line 33 that is added (or subtracted) to the output of laser frequency servo 27 to cause laser 21 to be detuned from the frequency specified by laser frequency servo 27. Laser frequency offset servo 31 operates by observing the energy difference, $\Delta E_Q$, between the two lower energy states in the quantum absorber at two different laser intensity levels. The change of the energy difference $\Delta E_Q$ could be observed in the microwave frequency error during the time interval shorter than the reciprocal of the unity gain frequency of the microwave frequency servo loop. Alternatively, the change of the energy difference $\Delta E_Q$ could be observed by measuring the microwave frequency $v_M$ during the time interval longer than the reciprocal of the unity gain frequency of the microwave frequency servo loop. Laser frequency offset servo 31 adjusts the offset signal such that the energy difference $\Delta E_Q$ is independent of small changes in the intensity of the laser output. The laser intensity is set by controller 32 in response to a signal on line 35. Denote the current value of the laser intensity by $I_L$. Laser frequency offset servo 31 adjusts the laser frequency offset signal on line 33 in a manner that depends on the energy difference $\Delta E_Q$. Laser frequency offset servo 31 measures $\Delta E_Q$ at laser intensities of $I_L + \delta I_L$ and $I_L - \delta I_L$. If $\Delta E_Q$ is the same at each of these laser intensities, the laser frequency offset signal on line 33 is not changed. If $\Delta E_Q(I_L + \delta I_L)$ is different from $\Delta E_Q(I_L - \delta I_L)$, the value of the offset signal on line 33 is altered by an amount that depends on $\Delta E_Q(I_L + \delta I_L) - \Delta E_Q(I_L - \delta I_L)$. It should be noted that when $\Delta E_Q(I_L + \delta I_L) = \Delta E_Q(I_L - \delta I_L)$ the dependence of the output frequency on the laser intensity has been substantially reduced or eliminated, and hence, the need for a laser having a highly stable output intensity has been reduced or eliminated for many applications.

Although the square-wave modulation on laser intensity is used as an example for generating a laser frequency offset signal, other types of modulation waveforms, together with appropriate demodulation methods, can also be used.

The unity gain frequencies and the modulation frequencies of the laser frequency servo-loop, the laser frequency offset servo-loop, and the microwave frequency servo-loop need to be chosen carefully so that the operation of any one of these three servo-loops does not interfere with the other two servo-loops.

The above discussion is based on the assumption $E_E > E_B > E_A$. However, the present invention also functions adequately if the relationship $E_E > E_A > E_B$ is satisfied.

The above-described embodiments of the present invention utilize a laser as the source of electromagnetic radiation that irradiates an absorption cell. However, other suitable electromagnetic radiation sources can be utilized. For example, the teachings of the present invention can be applied to electromagnetic radiation sources that are outside the optical range. It should also be noted that the frequency of the second electromagnetic radiation can be outside the microwave range. Accordingly, the terms pump electromagnetic source and pump radiation intensity will be used to refer to the source that induces transitions between one of the low energy states and one of the excited energy states independent of the frequency range of the radiation.

The embodiments of the present invention discussed above utilize a detection scheme in which the servo loops attempt to maximize the absorption of the laser radiation in the absorption cell. However, embodiments in which the servo loops attempt to maximize the fluorescence light leaving the absorption cell can also be constructed.

The above embodiments of the present invention have been directed to frequency standards in which the goal is to produce a standard signal whose frequency is relatively insensitive to variations in laser light intensity. However, the present invention can also be utilized to construct a sensor that measures some physical quantity such as magnetic field strength. Consider an absorption cell that is constructed from a material in which the two energy levels have an energy difference that depends on an external magnetic field that is applied to the material. In this case, the output frequency depends on the strength of the magnetic field and, hence, can be calibrated to provide a measurement of the magnetic field strength.

Suitable quantum absorbers include hydrogen atoms, alkali metals, especially isotopes of rubidium and cesium, ions from group IIA and IIB, and Yb$^+$.

The above-described embodiments of the present invention have been discussed in terms of quantum absorbers having only three energy states. However, the present invention will also operate satisfactorily with quantum absorbers having additional high energy states. In the more general case, the quantum absorber has first and second lower energy states, which belong to a manifold of the ground state or a metastable state, and a number of excited states. The optical radiation source induces transitions between the first lower energy state and at least one of the excited states. The quantum absorber in the excited state then could decay to the second lower energy state either directly or via intermediate transitions to other states that finally decay to the second lower energy state. The quantum absorber in the excited state could also decay to a state that is different from the first and second lower energy states. The microwave source induces transitions between the first and second lower energy states.

The embodiments discussed above determine the offset for the laser frequency that minimizes the dependence of $v_M$ on the intensity of the laser. However, systems in which the laser frequency is merely offset by a predetermined value can also be constructed. The offset will, in general, depend on the quantum absorber, the spectral lines being used, and laser intensity. Once these parameters are set, the required offset can be determined. This offset can then be incorporated in production versions of the frequency source that utilize the materials in question. While such embodiments do not compensate for the AC Stark shift as well as the servo version discussed above, these embodiments provide substantial improvements over prior art devices. Since these embodiments do not require the servo controller and hardware of the more complex systems, these embodiments are less expensive to construct.

The above-described embodiments utilize servo loops that operate by modulating the frequency of the microwave source or the intensity of the laser. Such servo loops can use a number of suitable waveforms. For example, sinusoidal waveforms, triangular waveforms, or square waveforms can all be utilized. In addition, the servo loops can set the desired quantities by testing the output of the detector at first and second values for the relevant intensity or frequency without modulating the quantity.

The servo loop that sets the offset can be based on a number of different signals. For example, the servo loop that sets $v_M$ generates an error signal that is normally used to move the value of $v_M$ from its current value to a new value. If the laser intensity is dithered between two values (or modulated) on a time scale that is short compared to the time scale over which $v_M$ is allowed to change, this error signal provides a measure of the dependence of the energy difference $\Delta E_Q$ on the laser intensity without the need to wait for the dependence to be reflected in the current value of $v_M$. Hence, the offset servo loop can utilize this error signal, or a signal derived from this error signal, as the error signal in the offset servo loop. This arrangement assures that the value of $v_M$ that is output as the frequency standard does not fluctuate due to the implementation of the offset servo loop.

Alternatively the laser intensity can be dithered between two values (or modulated) on a time scale that is long compared to the time scale over which $v_M$ is allowed to change. In this case, $v_M$ follows the change of the energy difference $\Delta E_Q$ when the laser intensity changes. The average value of $v_M$, or a frequency derived from the average value of $v_M$, can serve as a reference for measuring the dependence of $v_M$ on the laser intensity. This measurement provides the information about the dependence of the energy difference, $\Delta E_Q$, on the laser intensity. Thus, after being properly demodulated and processed, it can serve as the error signal of the offset servo loop.

Various modifications to the present invention will become apparent to those skilled in the art from the foregoing description and accompanying drawings. Accordingly, the present invention is to be limited solely by the scope of the following claims.

What is claimed is:

1. An apparatus comprising:
    an absorber comprising a material having first, second, and third energy states;
    a first radiation source that generates a first electromagnetic pump radiation having a frequency, $v_L$, that induces transitions between said first and third energy states, said first radiation source irradiating said absorber at a pump radiation intensity, said first and second energy states differing in energy by an amount that depends on said pump radiation intensity;
    a second radiation source that generates a second electromagnetic radiation having a frequency, $v_M$, that induces transitions between said first and second energy states, said second electromagnetic radiation source also irradiating said absorber;

a first controller that sets $v_M$ so as to maintain the absorption of said first electromagnetic radiation by said absorber at a target value; and a second controller that sets $v_L$ to a value that is offset from $v_{MAX}$, where $v_{MAX}$ is the value of $v_L$ at which the absorption of said first electromagnetic radiation by said absorber is maximized, said offset being chosen such that the dependence of said difference in energy between said first and second energy states on said pump radiation intensity at $v_L$ is less than the dependence of said difference in energy between said first and second energy states on said pump radiation intensity at $v_{MAX}$.

2. The apparatus of claim 1 further comprising an output circuit that generates a signal having a frequency determined by $v_M$.

3. The apparatus of claim 1 wherein said first radiation source comprises a laser and wherein said second radiation source comprises a microwave generator.

4. The apparatus of claim 1 wherein said second controller comprises a first servo loop that determines $v_{MAX}$.

5. The apparatus of claim 4 wherein said second controller further comprises a second servo loop that determines said offset.

6. The apparatus of claim 5 wherein said second servo loop determines said offset by determining said difference in energy between said first and second energy states at first and second values for said pump radiation intensity.

7. The apparatus of claim 5 wherein said second servo loop determines said offset by modulating said pump radiation intensity and determining changes in said difference in energy between said first and second energy states.

8. The apparatus of claim 5 wherein said second servo loop determines said offset by determining an error signal generated by said first controller at first and second values for said pump radiation intensity.

9. The apparatus of claim 5 wherein said second servo loop determines said offset by determining $v_M$ at first and second values for said pump radiation intensity.

10. The apparatus of claim 4 wherein said second controller utilizes a fixed offset and $v_{MAX}$ to set $v_L$.

11. The apparatus of claim 1 wherein said absorber comprises hydrogen or an alkali metal chosen from the group consisting of isotopes of rubidium or cesium, ions from group IIA and IIB of the periodic table, or Yb$^+$.

12. A method for stabilizing the frequency of a radiation source, said method comprising:

irradiating an absorber comprising a material having first, second, and third energy states with a first electromagnetic pump radiation having a frequency, $v_L$, that induces transitions between said first and third energy states, said first electromagnetic radiation having a pump radiation intensity, said first and second energy states differing in energy by an amount that depends on said pump radiation intensity;

irradiating said absorber with a second electromagnetic radiation having a frequency, $v_M$, that induces transitions between said first and second energy states;

setting $v_M$ so as to maintain the absorption of said first electromagnetic radiation by said absorber at a target value; and setting $v_L$ to a value that is offset from $v_{MAX}$, where $v_{MAX}$ is the value of $v_L$ at which the absorption of said first electromagnetic radiation by said absorber is maximized, said offset being chosen such that the dependence of said difference in energy between said first and second energy states on said electromagnetic pump radiation intensity at $v_L$ is less than the dependence of said difference in energy between said first and second energy states on said pump radiation intensity at $v_{MAX}$.

13. The method of claim 12 further comprising generating an output signal having a frequency determined by $v_M$.

14. The method of claim 12 wherein $v_{MAX}$ is determined by determining the absorption of said first electromagnetic radiation by said absorber at different values of $v_L$.

15. The method of claim 12 wherein $v_{MAX}$ is determined by modulating $v_L$.

16. The method of claim 12 wherein said offset is determined by determining said difference in energy between said first and second energy states at different values for said pump radiation intensity.

17. The method of claim 12 wherein said offset is determined by modulating said pump radiation intensity and determining said difference in energy between said first and second energy states.

18. The apparatus of claim 12 wherein said offset is determined by generating an error signal during the determination of $v_M$ at different values for said pump radiation intensity.

19. The method of claim 12 wherein said offset is determined by determining an error signal generated at first and second values for said pump radiation intensity.

20. The method of claim 12 wherein said offset is determined by determining $v_M$ at first and second values for said pump radiation intensity.

* * * * *